March 3, 1942. D. M. HANSON 2,274,690
DRAFT REGULATOR
Filed Oct. 21, 1940
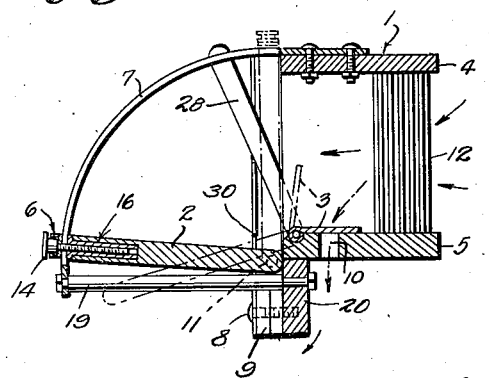
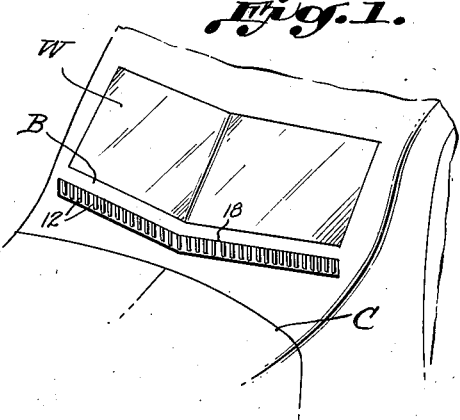
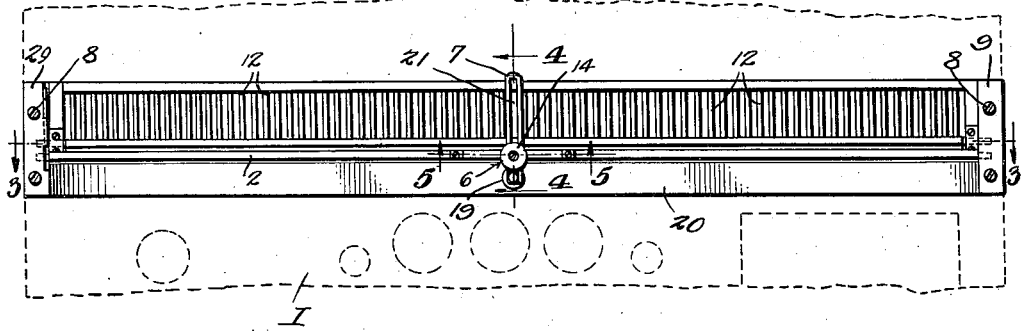
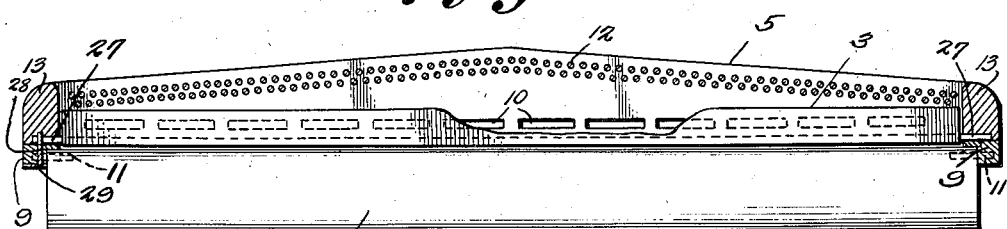
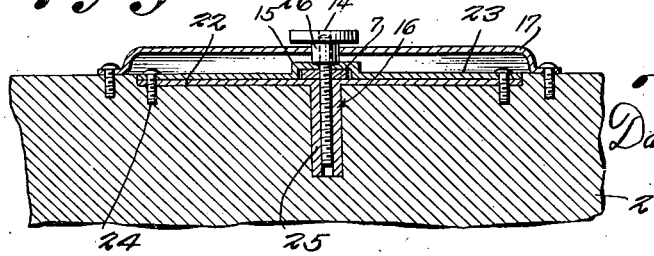
Inventor:
Daniel M Hanson Patented Mar. 3, 1942

2,274,690

UNITED STATES PATENT OFFICE 2,274,690

DRAFT REGULATOR

Daniel M. Hanson, Austin, Minn.

Application October 21, 1940, Serial No. 362,149

8 Claims. (Cl. 296—84)

This invention relates to a draft regulator for use on vehicles and while it is intended primarily for ventilating closed vehicle bodies, it is also advantageous for controlling cooling drafts on the drivers of open-bodied vehicles while driving in warm weather.

Heretofore, where the windshield has been fixedly mounted, the practice has been to direct air currents downwardly through the cowl into the vehicle body at a point below the instrument board. Control of the inflowing air has been limited and the direction of flow has always been substantially the same.

An object of the present invention is to provide a means whereby an air current can pass through practically the entire width of the base portion of the windshield, there being a regulating device easily operated by the driver whereby the current can be caused to flow into the vehicle body at any desired angle and along any predetermined path relative to the occupants of the vehicle.

A further object is to provide a draft regulator which can be installed in or built into the base of a windshield.

Another object is to provide a draft regulator having combined baffle and supporting means so positioned as to strengthen the device and also exclude rain, etc., carried by the air current to the regulator.

A still further object is to provide a shutter for controlling the draft, said shutter being easily operated by the driver and having a new and novel clamp associated therewith whereby the shutter can be held tightly in any position to which it might be adjusted.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a perspective view of the windshield portion of an automobile body equipped with the present improvements.

Figure 2 is an enlarged rear elevation of the draft regulator, adjacent parts being indicated by broken lines.

Figure 3 is a section on line 3—3, Figure 2, a portion being broken away.

Figure 4 is an enlarged section on line 4—4, Figure 2.

Figure 5 is an enlarged section on line 5—5, Figure 2.

Referring to the figures by characters of reference, W designates the windshield of a vehicle body which, in the present construction, has a base B upstanding a sufficient distance from the top of the cowl C to permit the present invention to be built thereinto or installed as a unit. In the invention as illustrated there is provided an elongated casing 1 extending throughout the length of the windshield and within base B, this casing opening at its front through said base and at its back into the vehicle body above the level of the instrument board I. The casing can be constructed in any manner desired. For example, and as shown in the drawing, it can consist of a top strip 4 and a bottom strip 5 connected by end pieces 13 to which bearing strips 9 are fastened by screws 8 or the like.

Seated in the upper and lower strips 4 and 5 near their forward edges are supporting pins 12 disposed close together and in staggered relation as shown particularly in Figure 3 so that these pins not only serve to reenforce the structure but also constitute a baffle which, without preventing the flow of air into the casing 1, nevertheless acts to prevent rain from beating straight back through the casing. As has been shown in the drawing, the front of the casing 1 conforms to the shape of the base B. If the windshield has forwardly converging sides, the front of the casing will be similarly shaped as has been shown in Figures 1 and 3. Should the front of the windshield be straight from side to side, the front of the casing 1 would also be straight. In any case, however, the back of the casing is straight and is adapted to be closed by a main shutter 2 having pivot pins 11 extending from its ends at the lower edge thereof and journalled in the strips 9. This shutter is so proportioned that when it is in raised position it will fit tightly against the strips 4 and 5 and completely close the casing at its rear end.

The free longitudinal edge of the main shutter 2 is so located that when the shutter is swung about its axis formed by the pivots 11, it will slide along an arcuate strip 7 one end of which is secured to the top strip 4 of the casing while the other or lower end is held securely at a point below the lowest level which can be assumed by the shutter 2. For example this lower end of the strip 7 can be fastened on a post 19 secured to a strip 20 extending downwardly from and suitably joined to the bottom strip 5.

The arcuate strip 7 is formed with a longitudinal slot 21, as shown and is positioned between two clamping strips 22 and 23 which are seated in the longitudinal edge of shutter 2 adjacent to the center thereof and fastened in place by screws 24 or the like. The strip 22 has a sleeve 25 extending from the center thereof and seated in a bore 16 in shutter 2. This sleeve is threaded internally. The strip 23 is offset at its center so as to bridge the slotted strip 7.

A clamping screw 14 extends through the offset portion 15 and the slot in strip 7 and is in threaded engagement with the sleeve 25. This screw has a collar 26 interposed between its head and the offset portion 15 whereby, when the screw is turned in one direction, the collar will press against the offset portion 15 while the screw is pulling on the sleeve 25, thereby causing the strip 7 to be tightly clamped so that the shutter 2 will be held firmly against movement after being adjusted to any desired angle along strip 7. If desired, and as shown in Figure 5, the strips 22 and 23 can be protected by a housing 17 secured to the edge of shutter 2 and through which the screw and its collar 26 extend.

Openings 10 are provided in the bottom strip 5 back of the grille formed by the pins or baffles 12 and these openings are adapted to be closed by a supplemental shutter 3 pivotally mounted at its back edge in the members 13 and strip 9 as shown at 27. This supplemental shutter is adapted, when in its normal position, to rest snugly on the strip 5 and close the openings 10. It can, however, be adjusted angularly by means of a lever 28 secured to one of the pins 27 and extending upwardly and inwardly from the casing. This lever can be made of resilient material so that it can snap into one or more notches 30 formed within a keeper 29 secured to one of the side portions of the casing. This keeper can be flat, as shown or arcuate or any other shape, it merely being essential that it be so located that the lever can be caused to spring into or out of the notch for the purpose of holding the supplemental shutter 3 following its adjustment to any position about its pivot 27.

As has heretofore been stated, the draft control device herein described can be made as a complete unit for installation within the upwardly stepped base of a windshield or it can be built into the vehicle structure at the time of manufacture. In any case the location of the regulator is such as to provide an elongated air intake opening coextensive in height and length with the open front of casing 1. When the shutter 2 is closed as indicated by broken lines in Figure 4 and the shutter 3 is closed as indicated by full lines in Figure 4 it will of course be impossible for any air to pass into the car body by way of the casing 1. By partly or entirely opening the supplemental shutter 3, however, air entering the opening 18 while the vehicle is moving forwardly, will be deflected downwardly through the openings 10 and into the vehicle by the usual channels. Normally, however, the supplemental shield 3 is closed and when it is desired to admit a current of air into the body of the vehicle, the screw 14 is loosened so that the gripping action of the strips 22 and 23 on strip 7 is relieved. It is then possible to swing the main shutter 2 to any desired position after which it can be securely held simply by tightening the screw 14 so as to cause the strips 22 and 23 to bind upon the strip 7. When the shutter 2 is fully opened, as shown in Figure 4, the air entering the casing 1 can flow straight back into the vehicle and onto the occupant or occupants of the front seat. This is particularly advantageous while driving in warm weather because the flow of air will keep the driver cool and stimulated. The direction of the air current can be readily changed, however, simply by loosening screw 14 and shifting the shutter upwardly about its axis of movement until it is brought to such an angle as to deflect the air current in the desired direction in the vehicle body. While the shutter 2 is in any position to which it may be adjusted, the supplemental shutter 3 can be partly or entirely raised to control the amount of air to be deflected by the main shutter 2. Thus two controls are provided by which the current can be regulated, the direction of flow in the vehicle body being under the control of the main shutter 2 while the volume of air thus deflected can be controlled by the supplemental shutter 3.

By arranging the baffle pins 12 in staggered relation as shown, they tend to exclude rain, snow and even insects which otherwise would be carried into the vehicle body with the swiftly moving air current.

It will be noted that the screw 14 is located at the center of the shutter where it can be easily reached by either occupant of the front seat of the vehicle and the operation of loosening, shifting and tightening the main shutter can be effected quickly with one hand.

It will be apparent, of course, that this draft regulator can be installed in all types of motor vehicles and any changes necessary to adapt it to vehicle bodies of different shapes and makes can be made readily by those skilled in the art.

What is claimed is:

1. A draft regulator for vehicles including a casing open at the front and back and proportioned to extend the full length of a windshield base, parallel front and back rows of pins disposed in staggered relation within the front portion of the casing, the pins of each row bridging the gaps between the pins of the other row and constituting a combined baffle and reenforcing means for the casing, and an angularly adjustable deflecting shutter positioned to open and close the back of the casing.

2. A draft regulator for vehicles including a casing open at the front and back and proportioned to extend the full length of a windshield base, parallel front and back rows of pins disposed close together but out of contact with each other and in staggered relation within the front portion of the casing, the pins of each row bridging the gaps between the pins of the other row and constituting a combined baffle and reenforcing means for the casing, and an angularly adjustable deflecting shutter positioned to open and close the back of the casing, said shutter being pivotally mounted at its lower edge for up and down swinging movement toward and from the casing.

3. A draft regulator for vehicles including a casing open at the front and back and proportioned to extend the full length of a windshield base, pins disposed in staggered relation within the front portion of the casing and constituting a combined baffle and reenforcing means for the casing, and an angularly adjustable deflecting shutter positioned to open and close the back of the casing, said shutter being pivotally mounted at its lower edge for up and down swinging movement toward and from the casing, a fixed slotted arcuate strip adjacent to and concentric with the path of movement of the shutter, lapping clamping strips carried by the shutter and positioned with the arcuate strip therebetween, and means extending through the clamping strips for binding them against and releasing them from the arcuate strip.

4. A draft regulator for vehicles including a casing open at the front and back and proportioned to extend the full length of a windshield base, pins disposed in staggered relation within the front portion of the casing and constituting a combined baffle and reenforcing means for the casing, and an angularly adjustable deflecting shutter positioned to open and close the back of the casing, said shutter being pivotally mounted at its lower edge for up and down swinging movement toward and from the casing, a fixed slotted arcuate strip adjacent to and concentric with the path of movement of the shutter, lapping clamping strips carried by the shutter and positioned with the arcuate strip therebetween, and means extending through the clamping strips for binding them against and releasing them from the arcuate strip, said means including a threaded sleeve on one of the clamping strips seated in the shutter, and a screw engaging the sleeve and extending through the other strips.

5. A draft regulator for vehicles including a casing and proportioned to extend the full length of a windshield base, said casing having a front inlet and a back outlet extending continuously from side to side of the casing, said outlet and inlet being positioned to allow air to flow horizontally through the casing, parallel front and back rows of parallel pins disposed in staggered relation within the front portion of the casing, the pins of each row bridging the gaps between the pins of the other row and constituting a combined baffle and reenforcing means for the casing, an angularly adjustable deflecting shutter positioned to close the back of the casing and to move into position entirely outside of the horizontal air stream to open the back of the casing thereby to permit unrestrained air flow through the casing, and an angularly adjustable controlling shutter within the casing, there being an air outlet opening in the bottom of the casing normally closed by the controlling shutter.

6. The combination with a casing open at the front and back for the passage of an air current, of a shutter pivotally mounted at its bottom edge and positioned to open or close the back of the casing, gripping strips secured to the top edge of the shutter, a threaded sleeve extending from one of the strips and into the shutter, the other strip being offset oppositely to the sleeve, a fixed and slotted arcuate strip extending between said strips and within the offset portion, and a screw extending through all of the strips and engaging the sleeve, said screw and sleeve cooperating to clamp the gripping strips upon or to release them from the arcuate strip.

7. The combination with a vehicle windshield, a cowl, and a windshield base upstanding from the cowl, said base having an air intake opening throughout the width of the windshield, of an angularly adjustable deflecting shutter back of the opening and mounted to swing about a transverse axis at its lower edge, parallel front and back rows of parallel pins, the pins of each row bridging the gaps between the pins of the other row, thereby constituting a baffle positioned in front of the shutter and extending continuously throughout the height and width of the intake opening, and means within reach of an occupant of the vehicle for shifting the shutter to vary the angle of deflection of an air current passing through the opening.

8. The combination with a vehicle windshield, a cowl, and a windshield base upstanding from the cowl, said base having a front air intake opening and a back air outlet opening throughout the width of the windshield, the outlet and inlet being at the same level in the casing, of separate means back of the opening and under control of the occupant of the vehicle for regulating the volume of air flowing through the base and the direction of flow on leaving the base, respectively, and a baffle in the inlet positioned to exclude insects and rain from the air stream leading to the regulating means, said baffle including closely arranged, parallel, spaced rows of parallel pins connecting the top and the bottom of the casing, the pins of each row bridging the gaps between the pins of the other row, said baffle extending throughout the width of the intake opening.

DANIEL M. HANSON.